(12) United States Patent
Ahn et al.

(10) Patent No.: US 10,236,508 B2
(45) Date of Patent: Mar. 19, 2019

(54) POSITIVE ACTIVE MATERIAL, POSITIVE ELECTRODE, AND LITHIUM BATTERY CONTAINING THE POSITIVE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Sungjin Ahn, Anyang-si (KR); Jinhwan Park, Seoul (KR); Jayhyok Song, Suwon-si (KR); Andrei Kapylou, Suwon-si (KR); Byongyong Yu, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 174 days.

(21) Appl. No.: 15/367,443

(22) Filed: Dec. 2, 2016

(65) Prior Publication Data

US 2017/0194643 A1    Jul. 6, 2017

(30) Foreign Application Priority Data

Dec. 31, 2015   (KR) .................. 10-2015-0191324

(51) Int. Cl.
*H01M 4/505* (2010.01)
*H01M 4/525* (2010.01)
*H01M 4/02* (2006.01)

(52) U.S. Cl.
CPC .......... *H01M 4/525* (2013.01); *H01M 4/505* (2013.01); *H01M 2004/021* (2013.01); *H01M 2004/028* (2013.01)

(58) Field of Classification Search
CPC ............... H01M 4/525; H01M 4/505; H01M 2004/021; H01M 2004/028
See application file for complete search history.

(56) References Cited

U.S. PATENT DOCUMENTS

| 5,718,989 A | 2/1998 | Aoki et al. |
| 6,040,090 A | 3/2000 | Sunagawa et al. |

(Continued)

FOREIGN PATENT DOCUMENTS

| JP | 2008204806 A | 9/2008 |
| JP | 2010108873 A | 5/2010 |

(Continued)

OTHER PUBLICATIONS

Kim, et al., "Electrochemical Properties of Nanosized Li2MnO3. Li(Ni0.8Co0.15Al0.05)O2 Composite Cathode Powders," International Journal of Electrochemical Science, vol. 8, 2013, pp. 3664-3675.

(Continued)

*Primary Examiner* — Stewart A Fraser
(74) *Attorney, Agent, or Firm* — Cantor Colburn LLP

(57) ABSTRACT

A positive active material includes an overlithiated lithium transition metal oxide including: a metal cation and a $Li_2MO_3$ phase, wherein M is at least one metal selected from a Period 4 transition metal having an average oxidation number of +4 and a Period 5 transition metal having an average oxidation number of +4, and wherein an amount of the $Li_2MO_3$ phase is less than or equal to about 20 mole percent, based on 1 mole of the overlithiated lithium transition metal oxide.

18 Claims, 12 Drawing Sheets

(56) References Cited

U.S. PATENT DOCUMENTS

| | | |
|---|---|---|
| 6,416,902 B1 | 7/2002 | Miyasaka |
| 8,673,499 B2 | 3/2014 | Nakura |
| 8,999,588 B2 | 4/2015 | Park et al. |
| 9,029,017 B2 | 5/2015 | Kim et al. |
| 2002/0114995 A1* | 8/2002 | Thackeray ........... C01G 23/002 429/224 |
| 2003/0047717 A1 | 3/2003 | Kim et al. |
| 2006/0099508 A1* | 5/2006 | Thackeray ........... H01M 4/131 429/231.1 |
| 2008/0311473 A1 | 12/2008 | Sasoka et al. |
| 2010/0248033 A1* | 9/2010 | Kumar .................. B82Y 30/00 429/223 |
| 2011/0089369 A1* | 4/2011 | Patoux ............... C01G 45/1257 252/182.1 |
| 2011/0305953 A1 | 12/2011 | Kim et al. |
| 2013/0022874 A1 | 1/2013 | Park et al. |
| 2013/0244105 A1* | 9/2013 | Chang .................. H01M 4/485 429/211 |
| 2013/0252105 A1* | 9/2013 | Lee ..................... H01M 4/0402 429/220 |
| 2013/0299735 A1 | 11/2013 | Chung et al. |
| 2014/0087261 A1* | 3/2014 | Li ........................ H01M 4/485 429/223 |
| 2016/0133929 A1* | 5/2016 | Hah ...................... H01M 4/364 429/220 |
| 2017/0214045 A1* | 7/2017 | Dai ....................... H01M 4/525 |

FOREIGN PATENT DOCUMENTS

| | | |
|---|---|---|
| KR | 100274235 B1 | 2/2001 |
| KR | 1020110136000 A | 12/2011 |
| KR | 1020140081663 A | 7/2014 |
| KR | 101550741 B1 | 9/2015 |
| KR | 101550956 B1 | 9/2015 |

OTHER PUBLICATIONS

Shojan, et al., "High energy $xLi_2MnO_3$-$(1-x)LiNi_{2/3}Co_{1/6}Mn_{1/6}O_2$ composite cathode for advanced Li-ion batteries," Journal of Power Sources, vol. 274, 2015, pp. 440-450.

* cited by examiner

POSITIVE ACTIVE MATERIAL, POSITIVE ELECTRODE, AND LITHIUM BATTERY CONTAINING THE POSITIVE ACTIVE MATERIAL

CROSS-REFERENCE TO RELATED APPLICATION

This application claims priority to and the benefit of Korean Patent Application No. 10-2015-0191324, filed on Dec. 31, 2015, in the Korean Intellectual Property Office, and all the benefits accruing therefrom under 35 U.S.C. § 119, the content of which is incorporated herein by reference in its entirety.

BACKGROUND

1. Field

The present disclosure relates to a positive active material, a positive electrode including the positive active material, and a lithium battery including the positive electrode.

2. Description of the Related Art

Due to the advancements of small, high tech devices such as digital cameras, mobile devices, laptops, and computers, demand for lithium secondary batteries as energy sources for such devices is rapidly increasing. Also, due to the commercialization of plug-in vehicles (also known as xEV), that is, hybrid electric vehicles (HEV), plug-in hybrid electric vehicles (PHEV), and electric vehicles (EV), safe lithium ion batteries having high capacity have been developed. To manufacture lithium batteries suitable for this purpose, various positive active materials have been tested.

As a positive active material of a lithium secondary battery, a single lithium cobalt oxide ($LiCoO_2$) has been used. A layered structure lithium composite metal oxide having high capacity (such as $Li(Ni—Co—Mn)O_2$, $Li(Ni—Co—Al)O_2$) has also been used. In addition, a spinel-type lithium manganese oxide ($LiMn_2O_4$) and an olivine-type iron phosphate oxide having high stability have drawn attention.

However, there is a still a need for a positive active material capable of conferring high capacity, improved lifespan characteristics, and thermal stability to a lithium battery.

SUMMARY

Provided is a high capacity positive active material with improved stability in their crystalline structure such that the lifespan characteristics and thermal stability of lithium batteries including the positive active material is improved.

Also provided are methods of preparing the positive active material.

Provided is a positive electrode including the positive active material.

Also provided is a lithium battery including the positive electrode.

Additional aspects will be set forth in part in the description which follows and, in part, will be apparent from the description, or may be learned by practice of the presented embodiments.

According to an aspect of an embodiment, a positive active material includes an overlithiated lithium transition metal oxide including: a metal cation and a $Li_2MO_3$ phase, wherein M is at least one metal selected from a Period 4 transition metal having an average oxidation number of +4 and a Period 5 transition metal having an average oxidation number of +4, wherein an amount of the $Li_2MO_3$ phase is less than or equal to about 20 mole percent (%), based on 1 mole of the overlithiated lithium transition metal oxide.

According to an aspect of another embodiment, the metal cation may be at least one metal cation selected from aluminum (Al), magnesium (Mg), gallium (Ga), titanium (Ti), vanadium (V), zinc (Zn), copper (Cu), chromium (Cr), strontium (Sr), yttrium (Y), zirconium (Zr), niobium (Nb), molybdenum (Mo), ruthenium (Ru), rhodium (Rh), palladium (Pd), silver (Ag), cadmium (Cd), and indium (In).

According to an aspect of another embodiment the metal cation may be at least one metal cation selected from V, aluminum (Al), Mg, Ca, scandium (Sc), Ti, Cr, manganese (Mn), iron (Fe), cobalt (Co), nickel (Ni), copper (Cu), zinc (Zn), Ga, Sr, Y, Zr, Nb, Mo, Ru, Rh, Pd, Ag, Cd, and In.

According to an aspect of another embodiment, the an amount of the metal cation may be in a range of about 0.1 mole % to about 10 mole %, based on 1 mole of the overlithiated lithium transition metal oxide.

According to an aspect of another embodiment, an amount of nickel may be at least 70 mole % based on a total molar amount of metal atoms excluding lithium included in the overlithiated lithium transition metal oxide.

According to an aspect of another embodiment, the overlithiated lithium transition metal oxide may be represented by Formula 1 below.

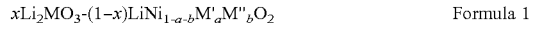  Formula 1

In the Formula 1 above,

M may be at least one metal selected from a Period 4 transition metal having an average oxidation number of +4 and a Period 5 transition metal having an average oxidation number of +4, M' may be at least one metal selected from a Period 4 transition metal having an average oxidation number of +3 and a Period 5 transition metal having an average oxidation number of +3, M" may be different from M', and is at least one metal cation selected from Al, Mg, Ga, Ti, V, Zn, Cu, Cr, V, Sr, Y, Zr, Nb, Mo, Ru, Rh, Pd, Ag, Cd, and In, and 0<x≤0.2; 0<a<1 and 0.001≤b≤0.1, where 0.7≤1-a-b<1.

According to an aspect of another embodiment, in Formula 1 above, M may be at least one selected from Mn, Ti, Zr, tin (Sn), and Mo, M' may be at least one selected from Co, Mn, Fe, Al, Mg, Zn, Cu, Cr, V, and Nb, and M" may be different from M', and may be at least one metal cation selected from Al, Mg, Ga, Ti, V, Zn, Cu, Cr, V, Sr, Y, Zr, Nb, Mo, Ru, Rh, Pd, Ag, Cd, and In.

According to an aspect of another embodiment, the overlithiated lithium transition metal oxide may be represented by Formula 2 below.

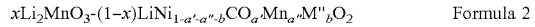  Formula 2

In Formula 2 above,

M" may be at least one metal cation selected from Al, Mg, Ga, Ti, V, Zn, Cu, Cr, V, Sr, Y, Zr, Nb, Mo, Ru, Rh, Pd, Ag, Cd, and In, 0<x≤0.2; 0<a'<1, 0<a"<1, and 0.001≤b≤0.1, where 0.7≤1-a'-a"-b<1.

According to an aspect of another embodiment, the overlithiated lithium transition metal oxide may have an average particle diameter of about 10 nanometers (nm) to about 500 micrometers (μm).

According to an aspect of another embodiment, a positive electrode includes the positive active material described above.

According to an aspect of another embodiment, a lithium battery includes the positive electrode.

According to an aspect of another embodiment, an overlithiated lithium transition metal oxide includes: a metal cation, and a $Li_2MO_3$ phase, wherein M is at least one metal selected from a Period 4 transition metal having an average oxidation number of +4 and a Period 5 transition metal having an average oxidation number of +4, and wherein an amount of the $Li_2MO_3$ phase is less than or equal to about 20 mole percent, based on 1 mole of the overlithiated lithium transition metal oxide.

According to an aspect of yet another embodiment, a method of preparing an overlithiated lithium transition metal oxide includes: combining a transition metal precursor, a compound including a metal cation, and a compound including lithium to prepare a mixture; and heat-treating the mixture at a temperature of less than or equal to about 800° C. to prepare the overlithiated lithium transition metal oxide, wherein the overlithiated lithium transition metal oxide including a metal cation and a $Li_2MO_3$ phase, wherein M is at least one metal selected from a Period 4 transition metal transition metal having an average oxidation number of +4 and a Period 5 transition metal having an average oxidation number of +4, and wherein an amount of the $Li_2MO_3$ phase is less than or equal to about 20 mole percent, based on 1 mole of the overlithiated lithium transition metal oxide.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
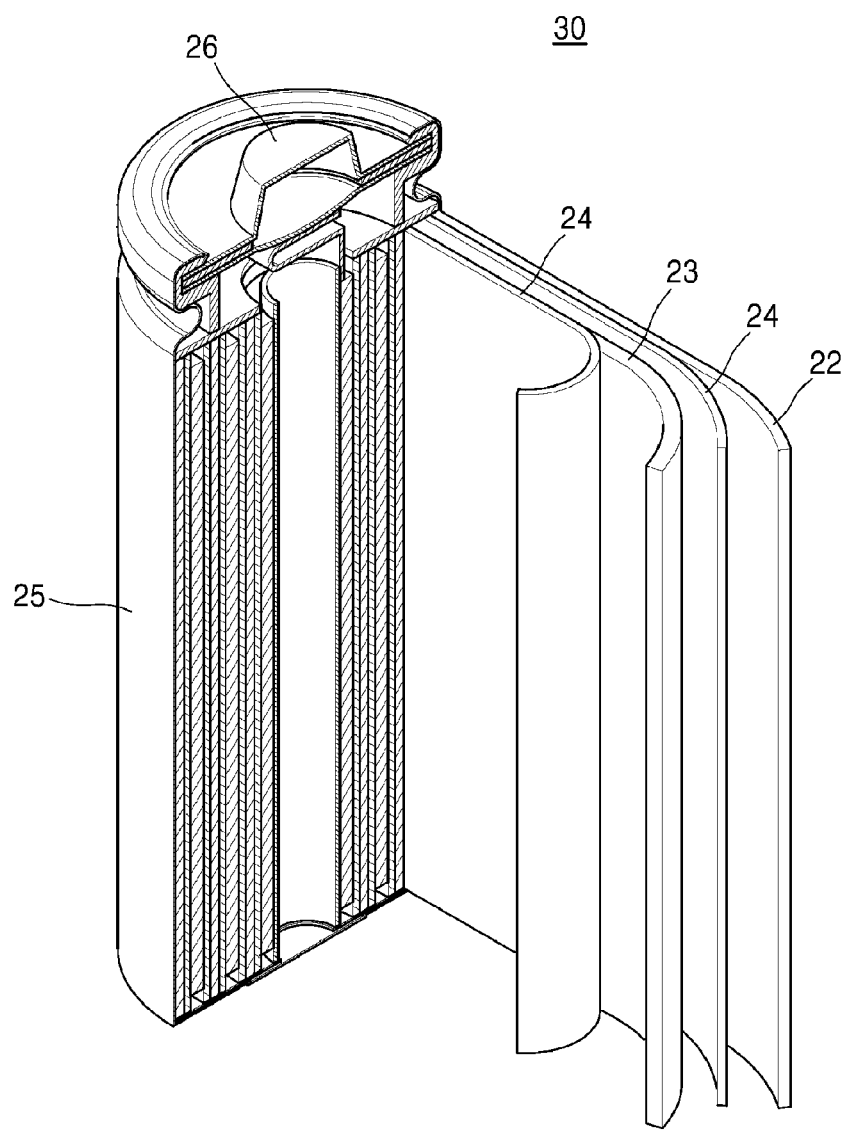
FIG. 1 is a schematic structure of a lithium battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As alternative positive active materials for use in lithium secondary batteries, lithium composite metal oxides including nickel (Ni) have been investigated for their ability to increase battery capacity. However, as the amount of nickel in the lithium composite metal oxide increases, a substantial amount of the lithium ions reversibly participate in a charge and discharge process, and thus, the lithium secondary battery may have a high reversible capacity (for example, >200 mAh/g). In addition, a lithium composite metal oxide having high amounts of nickel may undergo phase changes as a charging and discharging process progresses. As a result, the stability of the crystalline structure of the lithium composite metal oxide decreases, which reduces the battery capacity. Furthermore, the thermal stability of a battery also decreases due to the production of a large amount of heat which accompanies the phase changes.

In this regard, the inventors have discovered a high capacity positive active material with improved stability of the crystalline structure so that the lifespan characteristics and thermal stability of lithium batteries including the positive active material are improved.

According to an embodiment, the positive active material includes an overlithiated lithium transition metal oxide including a metal cation and a $Li_2MO_3$ phase complexed to form a composite, in which an amount of the $Li_2MO_3$ phase in the positive active material is less than or equal to about 20 mole %, based on 1 mole of the overlithiated lithium transition metal oxide. In the $Li_2MO_3$, M is at least one metal selected from a Period 4 transition metal having an average oxidation number of +4 and a Period 5 transition metal having an average oxidation number of +4.

The overlithiated lithium transition metal oxide may be a composite having a layered crystalline structure in which a $Li_2MO_3$ phase is complexed, and it may sometimes be in the form of a solid solution. In some instances, it may be a mixture of both a composite and a solid solution. Here, M may be at least one of Mn, Ti, Zr, Sn, and Mo. For example, M may be Mn.

The overlithiated lithium transition metal oxide is a $Li_2MnO_3$—$LiM'O_2$ -based positive active material in which a $Li_2MO_3$ phase is complexed on a layer of a $LiM'O_2$ phase. Here, the $Li_2MO_3$ phase is not simply mixed with the $LiM'O_2$ phase, but rather is integrated into a layered crystalline structure of the $LiM'O_2$ phase. $Li_2MO_3$ has a structure in which a transition metal layer and a Li ion layer are alternate, similar to a structure of $LiM'O_2$, wherein one-third (⅓) of metal ions in the transition metal layer are substituted with Li ions. As such, the $Li_2MnO_3$—$LiM'O_2$-based positive active material may have high capacity due to the additional Li ions that are substituted in the transition metal layer.

However, in the overlithiated lithium transition metal oxide, and while not wanting to be bound by theory, it is understood that when the amount of $Li_2MO_3$ phase exceeds 20 mole % of the overlithiated lithium transition metal oxide, the additional (e.g., doped) metal cations do not contribute further to heat stability and thus, doping effects may be negligible. For example, the amount of $Li_2MO_3$ phase in the overlithiated lithium transition metal may be less than or equal to about 20 mole percent (mole %), or about 2 mole % to about 15 mole %, or about 5 mole % to about 10 mole %.

According to an embodiment, an amount of nickel in the positive active material may be at least 70 mole %, based on a total molar amount of metal atoms included in the overlithiated lithium transition metal oxide, excluding lithium. For example, an amount of nickel may be about 70 mole % to about 90 mole %, more particularly, about 70 mole % to about 85 mole %, or about 70 mole % to about 80 mole %, based on a total molar amount of metal atoms included in the overlithiated lithium transition metal oxide, excluding lithium. As a result of including a large amount of nickel in the positive active material, a lithium battery including the positive active material may provide a higher capacity.

The overlithiated lithium transition metal oxide may be doped with a metal cation. The metal cation may be doped on the $LiM'O_2$ phase.

While not wanting to be bound by theory, it is understood that the metal cation may prevent changes which may occur in a crystalline structure of the overlithiated lithium transition metal oxide during charge and discharge. For example, when a large amount of nickel is included in the positive active material, as described above, a small amount of the metal cation is doped on a pathway for nickel, and as a result, the metal cation may inhibit cation mixing due to the movement of nickel which occurs during charge and discharge. As is further discussed above, cation mixing may reduce performance degradation and improve high temperature stability of the positive active material.

The metal cation may be at least one metal cation selected from a Period 2 to Period 7 element. According to an embodiment, the metal cation may be at least one metal cation selected from Al, Mg, Ga, Ti, V, Zn, Cu, Cr, V, Sr, Y, Zr, Nb, Mo, Ru, Rh, Pd, Ag, Cd, and In. The metal cation may be, for example, at least one metal cation selected from metal cations of Al, Mg, Ga, and Ti.

An amount of the doped metal cation may be in a range of about 0.1 mole % to about 10 mole %, based on 1 mole of the overlithiated lithium transition metal oxide. For example, an amount of the doped metal cation may be in a range of about 0.1 mole % to about 5 mole %, more particularly, in a range of about 0.2 mole % to about 1 mole %, based on 1 mole of the overlithiated lithium transition metal oxide. In the ranges described above, a crystalline structure of the overlithiated lithium transition metal oxide may be effectively stabilized.

According to an embodiment, the overlithiated lithium transition metal oxide may be represented by Formula 1 below.

$$x\text{Li}_2\text{MO}_3\text{-}(1-x)\text{LiNi}_{1-a-b}\text{M}'_a\text{M}''_b\text{O}_2 \quad \text{Formula 1}$$

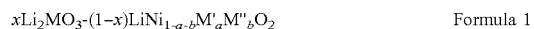

In Formula 1 above,

M is at least one metal selected from a Period 4 transition metal having an average oxidation number of +4 and a Period 5 transition metal having an average oxidation number of +4, M' is at least one metal selected from a Period 4 transition metal having an average oxidation number of +3 and a Period 5 transition metal having an average oxidation number of +3, M" may be different from M', and is at least one metal cation selected from Al, Mg, Ga, Ti, V, Zn, Cu, Cr, V, Sr, Y, Zr, Nb, Mo, Ru, Rh, Pd, Ag, Cd, and In, 0<x≤0.2; 0<a<1, and 0.001≤b≤0.1, where 0.7≤1-a-b<1.

According to an embodiment, in Formula 1 above, M may be at least one selected from Mn, Ti, Zr, Sn, and Mo, M' may be at least one selected from Co, Mn, Fe, Al, Mg, Zn, Cu, Cr, V, and Nb, M" is different from M', and may be at least one metal cation selected from Al, Mg, Ga, Ti, V, Zn, Cu, Cr, Sr, Y, Zr, Nb, Mo, Ru, Rh, Pd, Ag, Cd, and In.

For example, in Formula 1 above, M is Mn, M' includes at least one selected from Co and Mn, and M" may be at least one metal cation selected from Al, Mg, Ga, and Ti.

According to an embodiment, the overlithiated lithium transition metal oxide may be represented by Formula 2 below.

$$x\text{Li}_2\text{MnO}_3\text{-}(1-x)\text{LiNi}_{1-a'-a''-b}\text{Co}_{a'}\text{Mn}_{a''}\text{M}''_b\text{O}_2 \quad \text{Formula 2}$$

In Formula 2,

M" may be at least one metal cation selected from Al, Mg, Ga, Ti, V, Zn, Cu, Cr, Sr, Y, Zr, Nb, Mo, Ru, Rh, Pd, Ag, Cd, and In, 0<x≤0.2; 0<a'<1, 0<a"<1, and 0.001≤b≤0.1, where 0.7≤1-a'-a"-b<1.

According to an embodiment, the overlithiated lithium transition metal oxide may be further doped with fluorine.

For example, the overlithiated lithium transition metal oxide may be represented by Formula 3 below.

$$x\text{Li}_2\text{MnO}_{3-\delta}\text{F}_\delta\text{-}(1-x)\text{LiNi}_{1-a'-a''-b}\text{Co}_{a'}\text{Mn}_{a''}\text{M}''_b\text{O}_{2-\delta'}\text{F}_{\delta'} \quad \text{Formula 3}$$

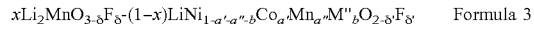

In Formula 3,

M" may be at least one metal cation selected from Al, Mg, Ga, Ti, V, Zn, Cu, Cr, V, Sr, Y, Zr, Nb, Mo, Ru, Rh, Pd, Ag, Cd, and In, 0<x≤0.2; 0<a'<1, 0<a"<1, and 0.001≤b≤0.1, where 0.7≤1-a'-a"-b<1; and 0<δ+δ'<0.1.

The overlithiated lithium transition metal oxide may be a particle having an average diameter of about 10 nanometers (nm) to about 500 micrometers (μm). For example, an average diameter of the overlithiated lithium transition metal oxide may be about 10 nm to about 100 μm, or about 10 nm to about 50 μm. When the average diameter is in the ranges described above, a lithium battery having improved properties may be obtained.

Furthermore, the overlithiated lithium transition metal oxide may be, for example, a nanoparticle having an average diameter of about 500 nm or less, about 200 nm or less, about 100 nm or less, about 50 nm or less, or about 20 nm or less, or about 10 nm to about 500 nm, or about 50 nm to about 200 nm. Such nanoparticles may increase a density of a mixture used to prepare a positive electrode polar plate, and thus, the nanoparticles are advantageous for attaining high-rate discharge characteristics. In addition, the nanoparticles may improve cycle properties due to the decreased specific surface area, which reduces reactivity with an electrolyte.

As used herein, the "average diameter," "average particle diameter" or "D50 particle size" refers to a particle diameter corresponding to about 50% of the particles in a distribution curve in which particles are accumulated in the order of particle diameter from the smallest particle to the largest particle, and a total number of the accumulated particles is 100%. D50 particle size may be measured by a method well known to those of skill in the art. For example, D50 particle size may be measured using a particle size analyzer, from a transmission electron microscope (TEM) or a scanning electron microscope (SEM) image. As an example of another method, D50 particle size may be measured by dynamic light-scattering method, and counting the number of particles within a predetermined size range, performing data analysis, and calculating an average particle diameter.

The overlithiated lithium transition metal oxide has a theoretical capacity of about 360 milliampere hours per gram (mAh/g) which is higher than a commercially available active material having a capacity of about 275 mAh/g (e.g. a Li(Ni—Co—Mn)O$_2$ material). The overlithiated lithium transition metal oxide also has an actual reversible capacity of about 250 mAh/g or greater. Thus, improved capacity characteristics may be provided in comparison to a commercially available positive active material (e.g., a material having a specific capacity of about 150 to 170 mAh/g, such as LiCoO$_2$).

The positive active material may be prepared by any suitable preparation method known in the art, for example, it may be prepared by a wet method such as co-precipitation and the like, or a dry method.

For example, co-precipitation may be used to synthesize a transition metal precursor in a hydroxide form, and the transition metal precursor and a metal cation containing compound may be dry mixed with an excessive amount of a lithium source (e.g. a compound including lithium) and then heat treated to obtain an overlithiated lithium transition metal in which metal cations are uniformly doped.

The metal cation containing compound may, for example, include at least one metal cation selected from Al, Mg, Ga, Ti, V, Zn, Cu, Cr, Sr, Y, Zr, Nb, Mo, Ru, Rh, Pd, Ag, Cd, and In. The metal cation containing compound may be at least one selected from a hydroxide-based salt, a sulfate, a nitrate, a carbonate, a halide salt, and an acetylacetonato nitrate of the metal cation, and it is not limited thereto.

The lithium source may be, for example, at least one selected from lithium carbonate, lithium nitrate, lithium oxide, lithium hydroxide, and lithium halide, and it is not limited thereto.

The heat treatment may be, for example, performed at a temperature of less than or equal to about 800° C. or less, more particularly, in a temperature range of about 600° C. to about 800° C., or about 650° C. to about 780° C. In the temperature ranges described above, an overlithiated lithium transition metal oxide having improved particle compactness may be obtained.

A period of heat treatment may be about 5 hours to about 20 hours, or about 5 hours to about 15 hours, or about 7 hours to about 12 hours.

According to an embodiment, when a transition metal precursor and a metal cation containing compound are heat treated, a fluorine compound may be further added along with the lithium source.

The fluorine compound may dope fluorine on the overlithiated lithium transition metal oxide by substituting fluorine for some of the oxygen atoms in the overlithiated lithium transition metal oxide. The fluorine-doped overlithiated lithium transition metal oxide may further improve lifespan properties of a lithium battery.

The fluorine compound may be added in an amount such that fluorine is less than or equal to about 10 mole %, based on a total of 1 mole of a transition metal included in the overlithiated lithium transition metal oxide.

The fluorine compound may comprise, for example, at least one selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate ($(NH_4)_3AlF_6$).

According to another embodiment, the positive electrode may include the positive active material described above.

For example, a positive electrode slurry composition is prepared by mixing the above-described positive active material, a conductive agent, a binder, and a solvent. A positive electrode plate with a positive active layer formed thereon may be prepared by directly coating and drying the positive electrode slurry composition on a positive electrode current collector. Alternatively, the positive electrode slurry composition may be cast on a separate support and a positive electrode plate with a positive active layer formed thereon may then be prepared by laminating a film detached from the support onto the positive electrode current collector.

Examples of the conductive agent include at least one selected from carbon black, graphite fine particles, natural graphite, artificial graphite, acetylene black, Ketjen black, carbon fiber; carbon nanotube; a metal powder, a metal fiber, and a metal tube comprising copper, nickel, aluminium, silver, or the like; a conductive polymer such as a polyphenylene derivative, and the like. However, the conductive agent is not limited thereto and any suitable conductive agent in the art may be used.

Examples of the binder may include at least one selected from vinylidene fluoride/hexafluoropropylene copolymer, polyvinylidene fluoride, polyacrylonitrile, poly(methyl methacrylate), polytetrafluoroethylene (PTFE), and a styrene butadiene rubber-based polymer. Examples of the solvent include at least one selected from N-methylpyrrolidone (NMP), acetone, water, and the like. However, the solvent is not limited thereto and any suitable solvent in the art may be used.

In some cases, pores in the electrode plate may be formed by further adding a plasticizer to the positive electrode slurry composition.

The amounts of the positive active material, conductive agent, binder, and solvent can be determined by one of skill in the art without undue experimentation. One or more of the conductive agent, binder, and solvent may be omitted depending upon the desired application and composition of the lithium battery.

Also, the positive electrode may include the above-described positive active material alone, or may further include an additional positive active material having at least one technical feature which differs from the above-described positive active material, for example, a different composition or a different particle diameter.

The additional positive active material may be any suitable lithium-containing metal oxide used in the art without limitation. For example, the additional positive active material may comprise at least one composite oxide of lithium and at least one metal selected from cobalt, manganese, and nickel. As particular examples thereof, a compound expressed as one of the following chemical formulas may be used: $Li_aA_{1-b}B'_bD_2$ (where $0.90 \leq a \leq 1$, $0 \leq b \leq 0.5$); $Li_aE_{1-b}B'_bO_{2-c}D_c$ (where $0.90 \leq a \leq 1$, $0 \leq b \leq 0.5$, $0 \leq c \leq 0.05$); $LiE_{2-b}B'_bO_{4-c}D_c$ (where $0 \leq b \leq 0.5$, $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, $0 < \alpha < 2$); $Li_aNi_{1-b-c}Co_bB'_cO_{2-\alpha}F'_2$ (where $0.90 \leq a \leq 1$, $0 b \leq 0.5$, $0 \leq c \leq 0.05$, $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, $0 < \alpha < 2$); $Li_aNi_bE_cG_dO_2$ (where $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1$, $0.001 \leq b \leq 0.1$); $Li_aCoG_bO_2$ (where $0.90 \leq a \leq 1$, $0.001 \leq b \leq 0.1$); $Li_aMnG_bO_2$ (where $0.90 \leq a \leq 1$, $0.001 \leq b \leq 0.1$); $Li_aMnG_bO_4$ (where $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is at least one selected from Ni, Co, Mn, or a combination thereof; B' is Al, Ni, Co, Mn, Cr, Fe, Mg, strontium (Sr), V, and rare earth elements; D is at least one selected from oxygen (O), fluorine (F), sulfur (S), and phosphorus (P); E is at least one selected from Co and Mn; F' is at least one selected from F, S, and P; G is at least one selected from Al, Cr, Mn, Fe, Mg, lanthanum (La), cerium (Ce), Sr, and V; Q is at least one selected from Ti, Mo, and Mn; I' is at least one selected from Cr, V, Fe, scandium (Sc), and yttrium (Y); and J is at least one selected from V, Cr, Mn, Co, Ni, and Cu.

Examples of the additional positive active material may be at least one selected from $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), and $FePO_4$.

A compound having a coating layer on the above-described compounds may be used as the additional positive active material, or a compound prepared by mixing the above-described compounds and the compound having a coating layer may be used. The coating layer may include a compound of a coating element such as an oxide, hydroxide, oxyhydroxide, oxycarbonate, or hydroxycarbonate. The coating layer may be amorphous or crystalline. Examples of the coating element included in the coating layer may be at least one selected from Mg, Al, Co, potassium (K), sodium (Na), calcium (Ca), silicon (Si), Ti, V, Sn, Ge, gallium (Ga), B, arsenic (As), and Zr. Any suitable coating method may be used to form a coating layer on a surface of the positive active material as long as the coating method does not adversely affect the physical properties of the positive active material. Examples of such coating methods include spray coating, dip coating, etc.). Further details regarding the coating method can be determined by one of skill in the art without undue experimentation and thus are not provided.

The positive electrode current collector may have a thickness range of about 3 micrometers (μm) to about 500 μm. The positive electrode current collector is not particularly limited as long as it has suitable conductivity and does not induce an undesirable chemical change in the battery.

Examples of the positive electrode current collector include at least one selected from copper, stainless steel, aluminium, nickel, titanium, sintered carbon, copper or stainless steel surface treated with carbon, nickel, titanium, or silver, and an aluminium-cadmium alloy, and the like. Also, adhesion of the positive active material may also be increased by forming fine irregularities on a surface of the positive electrode current collector. The positive electrode current collector may be used in various forms such as a film, sheet, foil, net, porous body, foam, or nonwoven fabric.

A mixture density of the positive electrode may be at least about 2.0 grams per cubic centimeter (g/cc).

A lithium battery according to another embodiment may include the positive electrode including the positive active material. The lithium battery, for example, includes a positive electrode including the positive active material; a negative electrode disposed to face the positive electrode; and an electrolyte disposed between the positive electrode and the negative electrode.

In the lithium battery, the positive electrode is prepared according to the above-described method of preparing a positive electrode.

A negative electrode may be prepared as follows: The negative electrode may be prepared in the same manner as the positive electrode except that a negative active material is used instead of the positive active material. Also, a conductive agent, a binder, and a solvent that are used in a negative electrode slurry composition may be the same as those described in the case of the positive electrode.

For example, the negative electrode slurry composition is prepared by mixing a negative active material, a binder, a solvent, and, selectively, a conductive agent, and the negative active material composition is directly coated on a negative electrode collector to prepare a negative electrode plate. Alternatively, the negative electrode slurry composition is cast on a separate support and a negative electrode plate may then be prepared by laminating negative active material films detached from the support on a negative electrode collector.

Also, the negative active material may be any suitable negative active material including those used in a lithium battery in the art. For example, the negative active material may include at least one selected from a lithium metal, a metal alloyable with lithium, transition metal oxide, non-transition metal oxide, and a carbon-based material.

Examples of the metal alloyable with lithium include at least one selected from Si, Sn, Al, Ge, lead (Pb), bismuth (Bi), antimony (Sb), an Si—Y' alloy (where Y' is an alkaline metal, alkaline earth metal, a Group 13 element, a Group 14 element, a transition metal, a rare earth element, or a combined element thereof, and is not Si), and an Sn—Y' alloy (where Y' is alkaline metal, alkaline earth metal, a Group 13 element, a Group 14 element, a transition metal, a rare earth element, or a combined element thereof, and is not Sn). Examples of the element Y' include at least one selected from Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, Pb, Ru, osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, indium (In), Ti, Ge, P, As, Sb, Bi, S, selenium (Se), tellurium (Te), and polonium (Po).

For example, the transition metal oxide may be at least one selected from lithium titanate, vanadium oxide, lithium vanadium oxide, and the like.

For example, the non-transition metal oxide may be at least one selected from $SnO_2$, $SiO_x$ ($0<x<2$), and the like.

The carbon-based material may be at least one selected from crystalline carbon and amorphous carbon. The crystalline carbon may be graphite such as amorphous, flat, flake-shaped, spherical, or fibrous natural graphite or artificial graphite, and the amorphous carbon may be at least one selected from soft carbon (low-temperature calcined carbon) or hard carbon, mesophase pitch carbide, calcined coke, and the like.

The amounts of the negative active material, conductive agent, binder, and solvent are amounts that can be determined by one of skill in the art without undue experimentation.

The negative electrode collector generally has a thickness range of about 3 μm to about 500 μm. The negative electrode collector is not limited as long as it has suitable conductivity and does not induce an undesirable chemical change in the battery. Examples of the negative electrode collector include at least one selected from copper, stainless steel, aluminium, nickel, titanium, sintered carbon, copper or stainless steel surface treated with carbon, nickel, titanium, or silver, an aluminium-cadmium alloy, and the like. Also, adhesion of the negative active material may be increased by forming fine irregularities on a surface of the negative electrode collector. The negative electrode collector may be used in various forms such as a film, sheet, foil, net, porous body, foam, or nonwoven fabric.

The positive electrode and the negative electrode may be separated by a separator, and any suitable separator used in a lithium battery may be used as the separator. In particular, a separator having excellent electrolyte-retention ability while having low resistance to the transfer of electrolyte ions is suitable. The separator may comprise a material which is at least one selected from glass fiber, polyester, polyethylene, polypropylene, and polytetrafluoroethylene (PTFE). The separator may be a nonwoven or woven fabric type. The separator having a pore diameter of about 0.01 μm to about 10 μm and a thickness of about 5 μm to about 300 μm may be used.

A lithium salt-containing non-aqueous electrolyte comprises a non-aqueous electrolyte and lithium. A non-aqueous electrolyte solution, a solid electrolyte, and an inorganic solid electrolyte may be used as the non-aqueous electrolyte.

The non-aqueous electrolyte solution may include at least one aprotic organic solvent selected from N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethyl sulfoxide, 1,3-dioxolane, formamide, dimethylformamide, acetonitrile, nitromethane, methyl formate, methyl acetate, a phosphate triester, trimethoxy methane, a dioxolane derivative, sulfolane, methylsulfolane, 1,3-dimethyl-2-imidazolidinone, a propylene carbonate derivative, a tetrahydrofuran derivative, an ether, methyl propionate, and ethyl propionate.

Examples of the organic solid electrolyte include at least one selected from a polyethylene derivative, a polyethylene oxide derivative, a polypropylene oxide derivative, a phosphate ester polymer, poly(L-lysine), polyester sulfide, polyvinyl alcohol, polyvinylidene fluoride, and a polymer including an ionically dissociable group.

Examples of the inorganic solid electrolyte include at least one selected from a nitride, a halide, and a sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

Any lithium salt may be used as long as it is suitable for use in a lithium battery. For example, as a material suitable for being dissolved in the non-aqueous electrolyte, at least one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, a lower aliphatic carboxylic acid lithium salt, lithium tetraphenyl borate, and lithium imide, may be used as the lithium salt.

The lithium battery may be a lithium-ion battery, a lithium-ion polymer battery, or a lithium polymer battery depending to the type of separator and electrolyte used. The lithium battery may be a cylindrical, prismatic, coin, or pouch type according to its shape, and may be categorized into a bulk type or a thin film type according to its size. Also, the lithium battery may be a lithium primary battery or a lithium secondary battery.

Since manufacturing methods of batteries of the foregoing types are well known in the art, further detailed description thereof is not provided.

FIG. 1 is a schematic illustration of a structure of a lithium battery according to an embodiment.

Referring to FIG. 1, a lithium battery 30 includes a positive electrode 23, a negative electrode 22, and a separator 24 disposed between the positive electrode 23 and the negative electrode 22. The positive electrode 23, the negative electrode 22, and the separator 24 may be wound or folded to be contained in a battery case 25. Subsequently, an electrolyte is injected into the battery case 25 and the battery case 25 is sealed with a sealing member 26 to complete the lithium battery 30. The battery case 25 may be a cylindrical, rectangular, or thin-film type. The lithium battery may be a lithium-ion battery.

The lithium battery is also suitable for applications benefiting from high capacity, high power, and high-temperature operation, such as electric vehicles, in addition to applications such as existing mobile phones and portable computers. The lithium battery may also be used in hybrid vehicles by combining it with an existing internal combustion engine, fuel cell, or super capacitor. Furthermore, the lithium battery may be used in electric bikes, power tools, and all other applications that may benefit from high power, high voltage, and high-temperature operation.

The present disclosure is described in more detail according to examples and comparative examples below. However, the examples only exemplify the technical idea of the present disclosure, and the scope of the present disclosure shall not be limited thereto.

EXAMPLES

Example 1

(1) Preparing a Positive Active Material

A positive active material was synthesized by a co-precipitation method described below.

To prepare a positive active material having a composition of 0.03Li$_2$MnO$_3$ .0.97LiNi$_{0.785}$Co$_{0.15}$Mn$_{0.05}$Al$_{0.015}$O$_2$, nickel sulfate, cobalt sulfate, and manganese sulfate were stoichiometrically mixed to prepare a starting material.

The mixture of nickel sulfate, cobalt sulfate, and manganese sulfate was dissolved in distilled water to a concentration of 2 molar (M) to obtain a precursor mixture. NH$_4$OH as a chelating agent and NaOH as a precipitant were added to the precursor mixture and then co-precipitated to obtain a precipitate of (Ni,Co,Mn)(OH)$_2$.

The precipitate (Ni,Co,Mn)(OH)$_2$ obtained according to the process above was washed with distilled water, dried at a temperature of 80° C. for 24 hours, and then mixed with aluminum hydroxide (Al(OH)$_3$) and lithium hydroxide (LiOH). Here, the aluminum hydroxide and lithium hydroxide were stoichiometrically mixed to obtain a positive active material of 0.03Li$_2$MnO$_3$.0.97LiNi$_{0.785}$Co$_{0.15}$Mn$_{0.05}$Al$_{0.015}$O$_2$.

The mixture was heat-treated in an air atmosphere at a temperature of 750° C. for hours to obtain a positive active material of 0.03Li$_2$MnO$_3$.0.97 LiNi$_{0.785}$Co$_{0.15}$Mn$_{0.05}$Al$_{0.015}$O$_2$.

(2) Manufacturing a Coin Half-Cell

The positive active material of Example 1 and a carbon conductor (Super-P; Timcal Ltd.) were uniformly mixed at a weight ratio of 90:5, and then a PVDF (polyvinylidene fluoride) binder solution was added thereto to prepare a positive electrode slurry having a weight ratio of active material:carbon conductor:binder of 92:4:4.

The positive electrode slurry was coated on an aluminum foil current collector having a thickness of 15 μm to prepare a positive electrode polar plate, and then additionally vacuum dried to manufacture a coin half-cell (CR2016 type) having a diameter of 12 mm.

During the cell manufacturing process, metal lithium was used as a counter electrode, a PTFE separator was used as a separator, and a solution in which 1.3 M of LiPF$_6$ was added in a mixture solution of ethylene carbonate (EC):dimethyl carbonate (DEC):ethyl methyl carbonate (EMC) (volume ratio of 3:5:2) was used as an electrolyte.

(3) Manufacturing a 18650 Full Cell

The positive active material of Example 1 and a carbon conductor (Super-P; Timcal Ltd.) were uniformly mixed at a weight ratio of 90:5, and then PVDF (polyvinylidene fluoride) binder solution was added thereto to prepare a positive electrode slurry having a weight ratio of active material:carbon conductor:binder in of 92:4:4.

On an aluminum foil current collector having a thickness of 12 μm, the positive electrode slurry was coated in an amount of 10 milligrams per square centimeter (mg/cm$^2$). A coated polar plate was dried at a temperature of 120° C. for 15 minutes and then pressed to manufacture a positive electrode.

Graphite as a negative active material and a mixture of styrene butadiene rubber (SBR) and carboxymethyl cellulose (CMC) in a weight ratio of 1:1 as a binder were mixed to prepare a negative electrode slurry.

The negative electrode slurry was coated in an amount of 9 mg/cm$^2$ on a copper foil current collector having a thickness of 10 μm. A coated polar plate was dried at a temperature of 120° C. for 15 minutes and then pressed to manufacture a positive electrode.

The positive electrode and the negative electrode were used, a PTFE separator was used as a separator, and a solution in which 1.3 M of LiPF$_6$ was added in a mixture solution of ethylene carbonate (EC):ethyl methyl carbonate (EMC):dimethyl carbonate (DEC) (volume ratio of 3:5:2) was used as an electrolyte to manufacture a 18650 type full cell.

Example 2

The same processes were used as described in Example 1 except for using magnesium hydroxide (Mg(OH)$_2$) instead of aluminum hydroxide to prepare a positive active material having a composition of 0.03Li$_2$MnO$_3$.0.97 LiNi$_{0.79}$Co$_{0.15}$Mn$_{0.05}$Mg$_{0.01}$O$_2$ and using the positive active material of the above-described composition to manufacture a coin half-cell and a coin full cell.

Example 3

The same processes were used as described in Example 1 except for using gallium hydroxide (Ga(OH)$_3$) instead of aluminum hydroxide to prepare a positive active material having a composition of 0.03 Li$_2$MnO$_3$.0.97LiNi$_{0.785}$Co$_{0.15}$Mn$_{0.05}$Ga$_{0.015}$O$_2$ and using the positive active material of the above-described composition to manufacture a coin half-cell and a coin full cell.

Comparative Example 1

The same processes were used as described in Example 1, except for stoichiometrically controlling the amounts of nickel sulfate, cobalt sulfate, and manganese sulfate to prepare a positive active material that is not doped with aluminum cations and which has a composition of 0.03 Li$_2$MnO$_3$.0.97 LiNi$_{0.80}$Co$_{0.15}$Mn$_{0.05}$O$_2$ and using the positive active material to manufacture a coin half-cell and a coin full cell.

Evaluation Example 1: XRD Analysis

Figure 2:
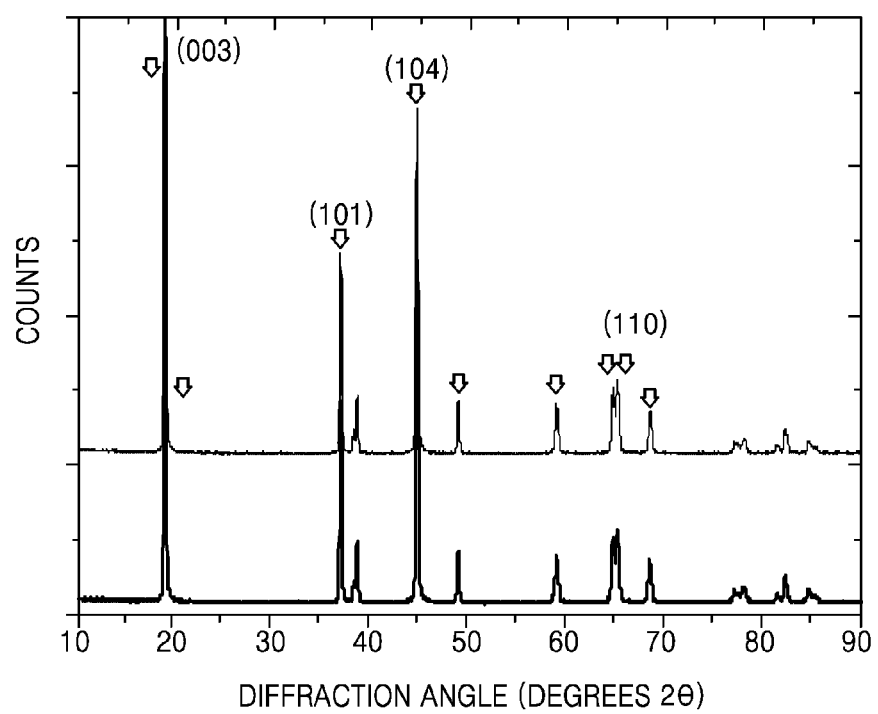
FIG. 2 is a graph of counts versus diffraction angle (degrees two-theta (2θ)) showing the results of X-ray diffraction analysis of the positive active material prepared in Example 1.
Figure 3:
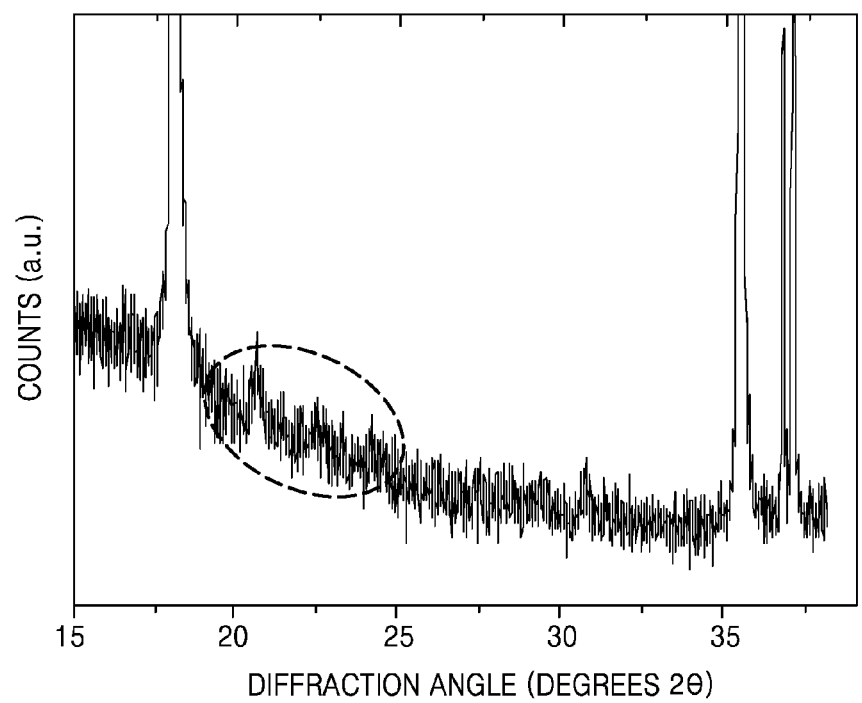
FIG. 3 is a graph of counts (arbitrary units, a.u.) versus diffraction angle (degrees two-theta, 2θ) showing the results of X-ray diffraction analysis of the positive active material prepared in Example 1.

An X-ray diffraction (XRD) test was performed with respect to the positive active material prepared in Example 1 and results thereof are shown in FIGS. 2 and 3. XRD was measured using Cu-K$\alpha$ rays.

and the primary particles when they are doped with metal cations. From this, it may be concluded that the metal cations are uniformly doped within the entire surface of bulk-type powder.

Evaluation Example 3: Evaluation of Battery Characteristics (1)

Initial efficiency, capacity, and rate characteristics of the coin half-cells manufactured in Comparative Example 1 and Example 1 were measured as described below and the results thereof are shown in Table 1 below.

Charge and discharge capacity of the first cycle was measured by 4.35 volts (V) (vs Li) charging in a constant current mode (cc mode) by using a current capacity of 0.1 C for formation and then cutting-off at a current of 0.05 C rate while maintaining 4.35 V in a constant voltage mode (cv mode). Thereafter, the initial efficiency was measured by applying a 2.8 V (vs Li) constant current mode (cc mode) using a current capacity of 0.1 C. When measuring rate characteristics, the half-cells were 4.35 V (cc-cv mode, 0.05 c cut) charged by uniformly applying a current capacity of 0.5 C and a discharge capacity was measured by applying current capacities corresponding to 0.2 C, 0.33 C, 1 C, 2 C, and 3C, respectively, during a 2.8 V (vs Li) discharge (cc mode). Here, the initial efficiency (I.E.) is defined as a first cycle discharge capacity/first cycle charge capacity and the rate characteristics are defined as a ratio of discharge capacities as shown in Table 1 below. In Table 1 below, "Cha" refers to "charge" and "Dis" refers to "discharge."

TABLE 1

| | 1$^{st}$ cycle | | | Rate characteristics | | | | | | |
|---|---|---|---|---|---|---|---|---|---|---|
| Sample Name | 0.1 C Cha (mAh/g) | 0.1 C Dis (mAh/g) | I.E. (%) | 0.2 C Dis (mAh/g) | 0.33 C Dis (mAh/g) | 1 C Dis (mAh/g) | 2 C Dis (mAh/g) | 3 C Dis (mAh/g) | 2 C/0.2 C (%) | 3 C/0.33 C (%) |
| Comparative Example 1 | 227 | 214 | 94.6% | 211 | 208 | 199 | 192 | 187 | 90.7% | 89.9% |
| Example 1 | 226 | 214 | 94.5% | 210 | 207 | 198 | 191 | 187 | 90.7% | 90.3% |

As shown in FIG. 2, the positive active material having a composition of 0.03Li$_2$MnO$_3$.0.97LiNi$_{0.785}$Co$_{0.15}$Mn$_{0.05}$Al$_{0.015}$O$_2$ prepared in Example 1 shows OLO specific peaks, and additives or additional phases formed by Al doping were not observed. Also, it was confirmed that a lattice constant in a c-axis direction decreased from 14.19 angstroms (Å) to 14.18 Å due to the Al doping.

Also, as shown in FIG. 3, characteristic peaks corresponding to the Li$_2$MnO$_3$ phase appear between 20° and 25°.

Evaluation Example 2: SEM Analysis

FESEM analysis (Electron Probe Micro Analyzer) was performed with respect to the positive active materials prepared in Comparative Example 1 and Example 1 to observe microstructures of the positive active materials.

Figure 4A:
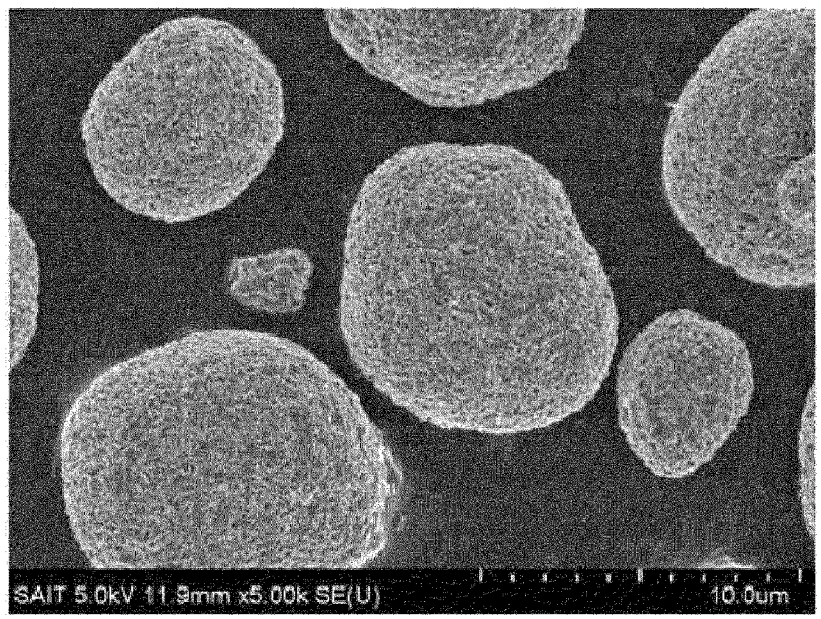
FIGS. 4A and 4B are Field Emission Scanning Electron Microscope (FESEM) images of a positive active material prepared in Comparative Example 1.
Figure 4B:
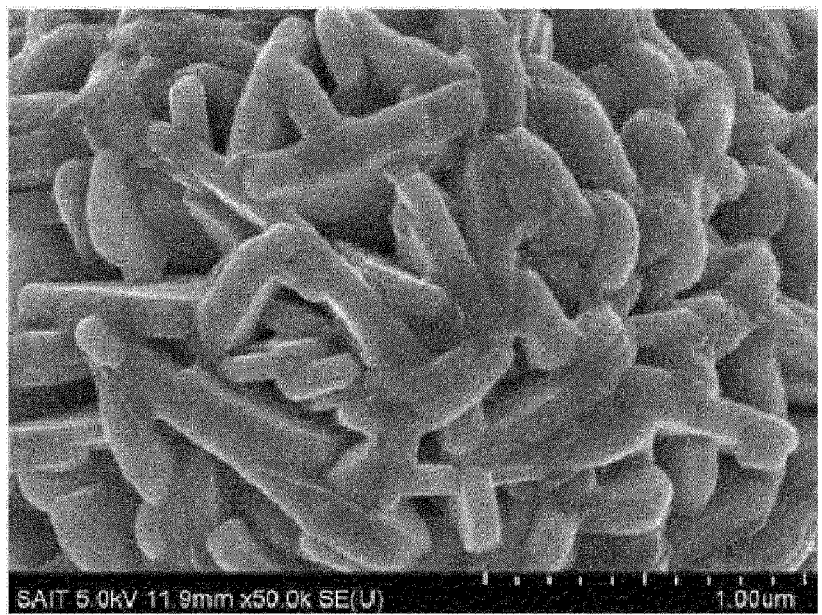
Figure 5A:
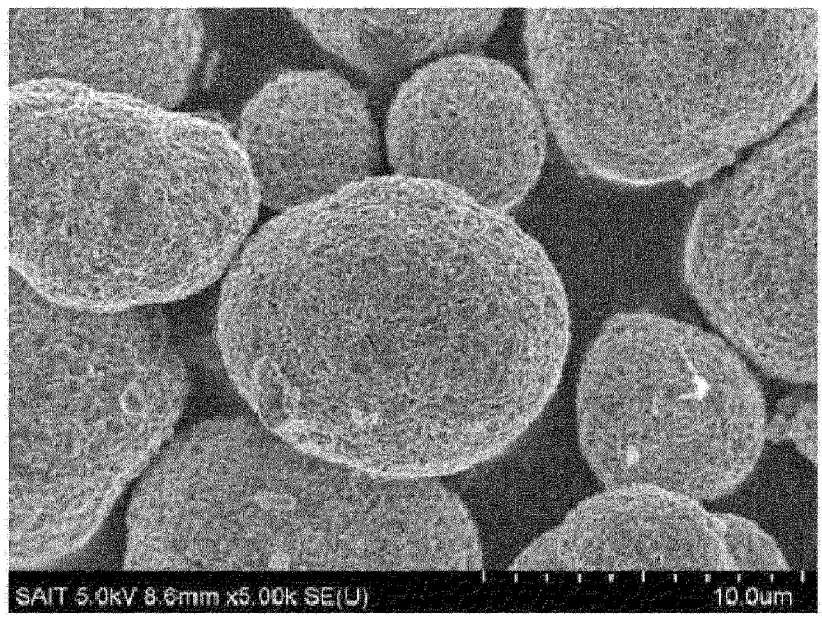
FIGS. 5A and 5B are FESEM images of the positive active material prepared in Example 1.
Figure 5B:
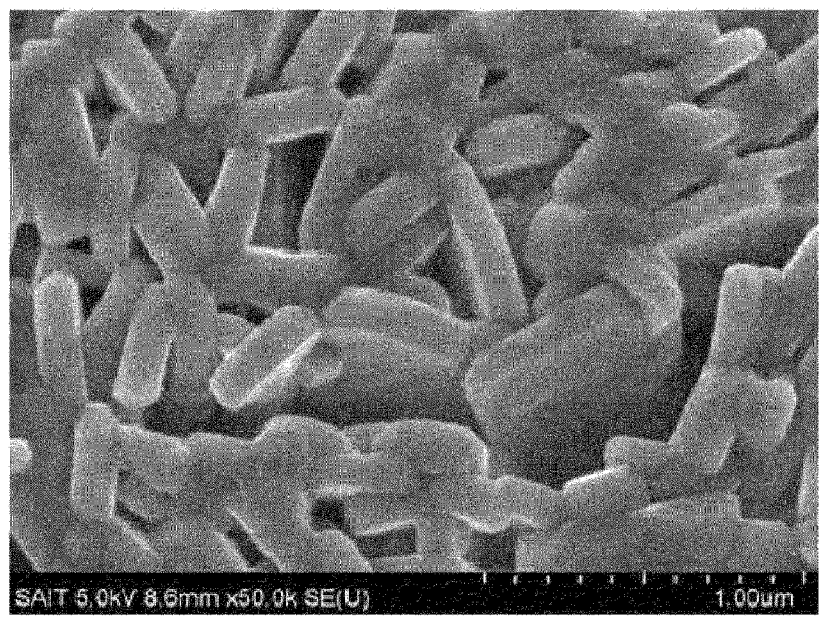

FESEM images showing structures of secondary particles and primary particles of the positive active material prepared in Comparative Example 1 are respectively shown in FIGS. 4A and 4A and FESEM images showing structures of secondary particles and primary particles of the positive active material prepared in Example 1 are respectively shown in FIGS. 5A and 5A.

As shown in FIGS. 4A and 4B and 5A and 5B, there is no substantial change in morphology of the secondary particles As shown in Table 1 above, the initial efficiency is almost the same when the coin half-cells are doped with the metal cations as in Example 1, but rate characteristic improved compared to the untreated coin full-cell and the coin half-cell in Comparative Example 1.

Evaluation Example 4: Evaluation of Battery Characteristics (2)

The coin full-cells manufactured in Comparative Example 1 and Example 1 were charged and discharged 300 times under the conditions of charging at a constant current of 1 C rate until their voltage reached 4.35 V and then discharging at a constant current of 1 C until their voltage reached 2.35 V.

Figure 6:
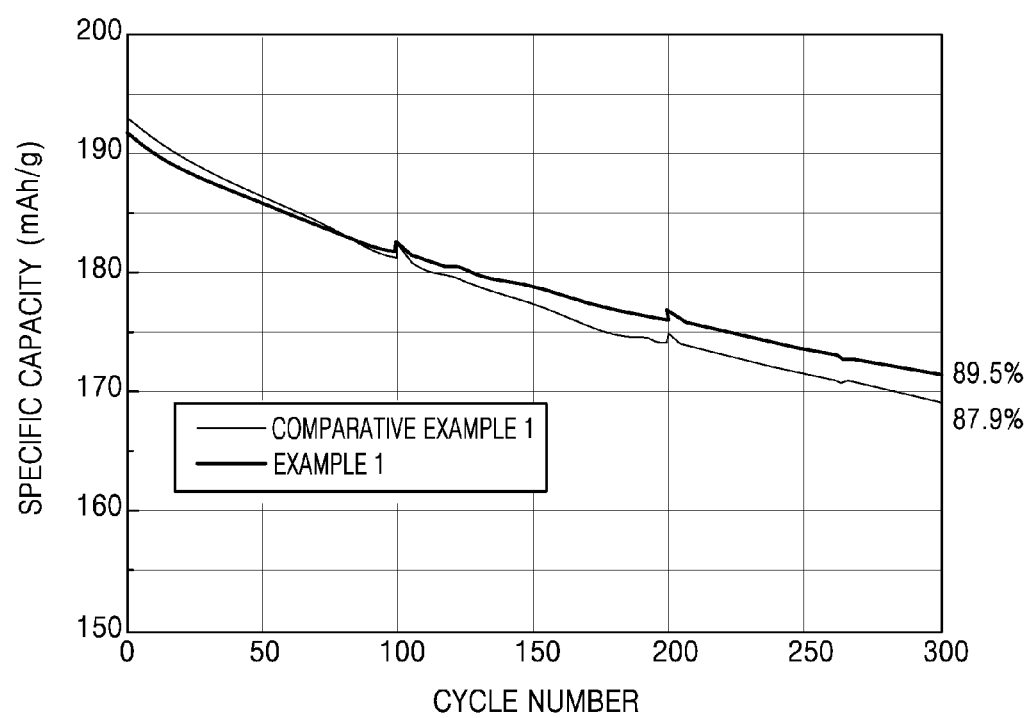
FIG. 6 is a graph of specific capacity (milliampere hours per gram, mAh/g) versus cycle number showing a change in the discharge capacities of the lithium batteries manufactured in Comparative Example 1 and Example 1 with increasing number of cycles.

Discharge capacities according to cycle number for Comparative Example 1 and Example 1 are shown in FIG. 6.

By measuring a capacity retention rate in the 300$^{th}$ cycle, the capacity retention rate in Comparative Example 1 was 87.9% while the capacity retention rate in Example 1 was 89.5%. The capacity retention rate is measured by Equation 1 below.

Capacity retention rate [%]=[Discharge capacity in the 300$^{th}$ cycle/discharge capacity in the 1$^{st}$ cycle]×100%    Equation 1

As shown in the results above, the doped coin cells have improved lifespan characteristics compared to those that are not doped.

Evaluation Example 5: Evaluation of Thermal Stability

The coin half-cells manufactured in Comparative Example 1 and Example 1 were charged at a constant current of 0.1 C (cc-cv) until they reached a voltage of 4.3 V (vs. Li). After the coin half-cells reached a voltage of 4.3 V, the coin half-cells were charged at a constant voltage of 4.3 V until the value of constant current reached 1/10 of the initial value. After the charging, in a dry room, the coin cells were disassembled such that there is no interference between the positive electrodes. The mixture on the positive electrode polar plate was taken out to evaluate thermal stability. In the evaluation of thermal stability, differential scanning calorimetry (DSC) analysis was used and a temperature was increased at intervals of 10° C. within a range of 30° C. to 400° C. to measure calorific values obtained when the positive active material in the mixture reacts with an electrolyte at varying temperatures, which were then converted into unit weight.

Figure 7:
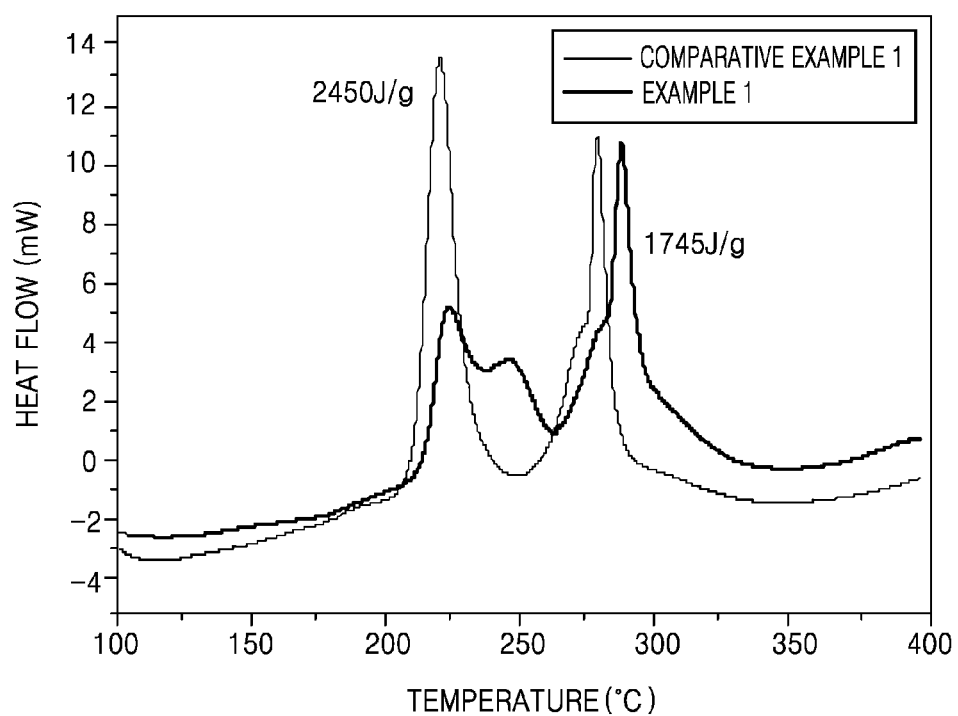
FIG. 7 is a graph of heat flow (milliwatts, mW) versus temperature (° C.) showing the results of thermal stability evaluation of the lithium batteries manufactured in Comparative Example 1 and Example 1.

DSC analysis results of the coin half-cells manufactured Example 1 and Comparative Example 1 are shown in FIG. 7.

As shown in FIG. 7, it may be concluded that the positive active material doped with Al cations disintegrates at a higher temperature than the undoped positive active material. While the coin half-cell of Comparative Example 1 showed a calorific value of 2450 J/g, the coin half-cell of Example 1 showed a calorific value of 1745 J/g. These results suggest that the positive active material has improved thermal stability when doped with Al cations.

Figure 8:
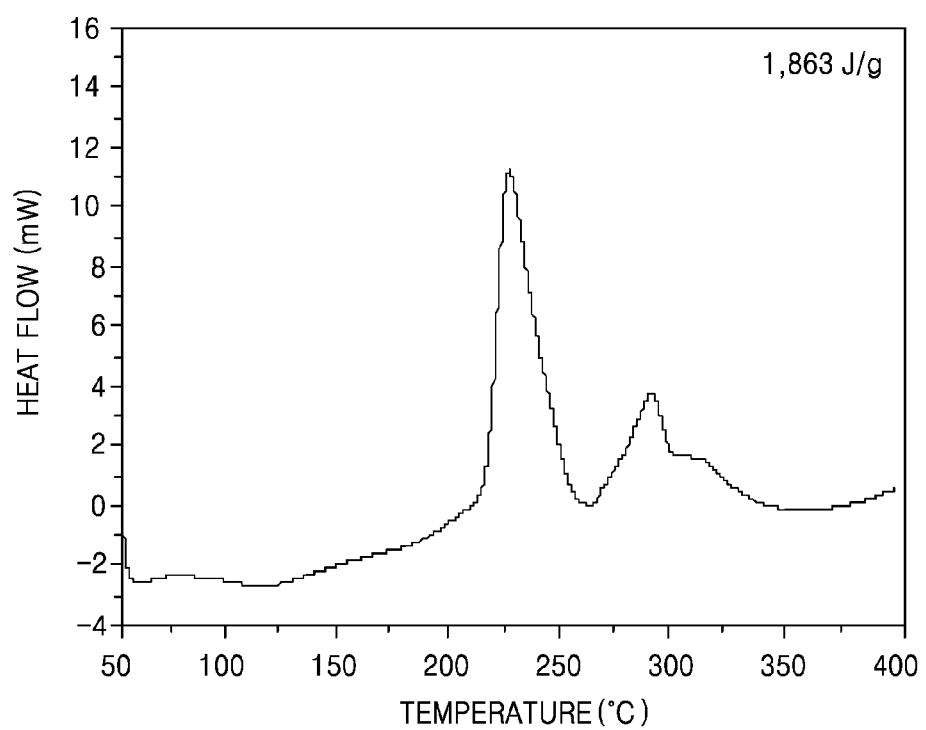
FIG. 8 is a graph of heat flow (mW) versus temperature (° C.) showing the results of thermal stability evaluation of the lithium battery manufactured in Example 4.
Figure 9:
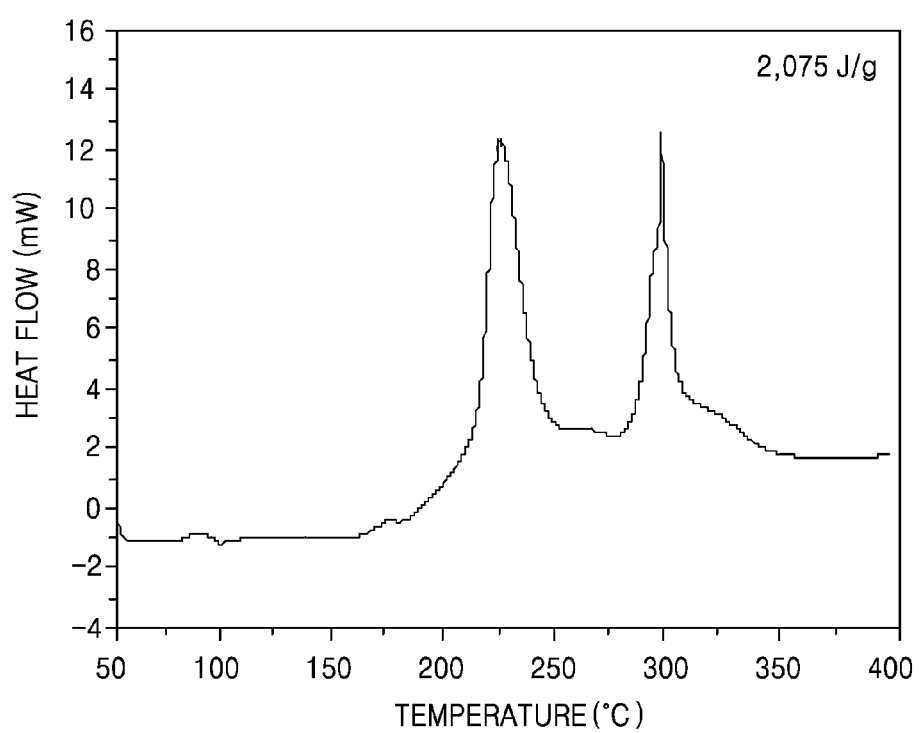
FIG. 9 is a graph of heat flow (mW) versus temperature (° C.) showing the results of thermal stability evaluation of the lithium battery manufactured in Example 5.

Also, to confirm doping effects of other metal cations, DSC analyses were performed with respect to the coin half-cells manufactured in Example 4 and Example 5, and DSC analysis results are shown in FIG. 8 and FIG. 9, respectively.

As shown in FIGS. 8 and 9, it may be concluded that the coin half-cells doped with Mg cations and Ga cations disintegrate at a higher temperature than undoped coin half-cells. The coin half-cells doped with Mg cations showed a calorific value of 1863 J/g and those doped with Ga cations showed a calorific value of 2075 J/g. In the case of other metal cations, it may be concluded that doping improved thermal stability of the positive active material.

Evaluation Example 6: Doping Effects According to Different Amounts of Li$_2$MnO$_3$ The effects of doping metal cations in a positive active material containing different amounts of Li$_2$MnO$_3$ were observed.

The same processes were used as described in Example 1 to prepare a positive active material doped with Al cations, except for changing the amount of Li$_2$MnO$_3$ in the positive active material. Specifically, the amount of Li$_2$MnO$_3$ in the positive active material was 0 mole %, 5 mole %, 10 mole %, 20 mole %, 30 mole %, and 40 mole %, and the positive active material obtained therefrom was used to manufacture a coin half-cell.

For comparison, the same processes as described in Comparative Example 1 were used to prepare a positive active material that is not doped with metal cations, while changing the amount of Li$_2$MnO$_3$ in the positive active material to 0 mole %, 5 mole %, 10 mole %, 20 mole %, 30 mole %, and 40 mole %. Positive active materials obtained therefrom were used to manufacture coin half-cells.

Figure 10:
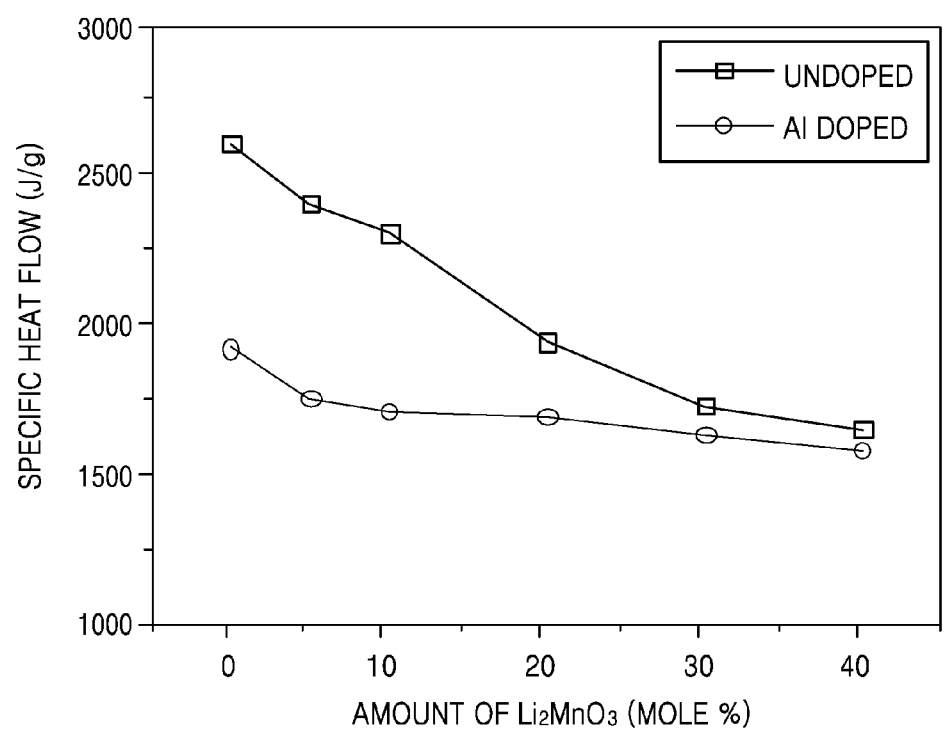
FIG. 10 is a graph of specific heat flow (joules per gram (J/g)) versus amount of $Li_2MnO_3$ (mole percent, %) which shows the results of differential scanning calorimetry (DSC) analysis and shows the effect of doping metal cations when varying the amounts of $Li_2MnO_3$ in a positive active material.

A DSC analysis was performed with respect to the coin half-cells described in Evaluation Example 5, and the results obtained therefrom are shown in FIG. 10.

As shown in FIG. 10, in a region where the amount of Li$_2$MnO$_3$ exceeds 20 mole %, Al cation doping contributes substantially less to a reduction in DSC calorific value. Without being limited by theory, it is believed that this is because Li$_2$MnO$_3$ itself contributes to the structural stability of the overlithiated lithium transition metal oxide. Accordingly, a region where Li$_2$MnO$_3$ complexation and Al doping effects may be maximized is where the amount of Li$_2$MnO$_3$ is 20 mole % or less.

Changes to the crystalline structure of the positive active material are inhibited and thus, the positive active material may contribute to a lithium battery having high capacity, improved lifespan characteristics, and thermal stability.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive active material comprising an overlithiated lithium transition metal oxide represented by Formula 1:

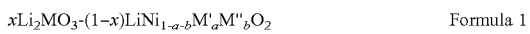

$x$Li$_2$MO$_3$-(1-$x$)LiNi$_{1-a-b}$M'$_a$M"$_b$O$_2$    Formula 1 wherein,
M is at least one metal selected from a Period 4 transition metal having an average oxidation number of +4 and a Period 5 transition metal having an average oxidation number of +4,
M' is at least one metal selected from a Period 4 transition metal having an average oxidation number of +3 and a Period 5 transition metal having an average oxidation number of +3,
M" is different from M', and is at least one metal cation selected from Al, Mg, Ga, Ti, V, Zn, Cu, Cr, Sr, Y, Zr, Nb, Mo, Ru, Rh, Pd, Ag, Cd, and In, and
$0 < x \leq 0.2$; $0 < a < 1$ and $0.001 \leq b \leq 0.1$, where $0.7 \leq 1-a-b < 1$.

2. The positive active material of claim 1, wherein x is about 0.02 to about 0.15.

3. The positive active material of claim 1, wherein M" is Al, Mg, or Ga.

4. The positive active material of claim 1, wherein b is about 0.01 to about 10 mole percent.

5. The positive active material of claim 1, wherein M is at least one metal selected from Mn, Ti, Zr, Sn, and Mo.

6. The positive active material of claim 1, wherein an amount of nickel in the positive active material is at least 70 mole percent, based on a total molar amount of metal atoms in the overlithiated lithium transition metal oxide, excluding lithium.

7. The positive active material of claim 6, wherein the amount of nickel is about 70 mole percent to about 90 mole percent, based on a total molar amount of metal atoms in the overlithiated lithium transition metal oxide, excluding lithium.

8. The positive active material of claim 1, wherein
M is at least one selected from Mn, Ti, Zr, Sn, and Mo,
M' is at least one selected from Co, Mn, Fe, Al, Mg, Zn, Cu, Cr, V, and Nb, and
M" is different from M', and is at least one metal cation selected from Al, Mg, Ga, Ti, V, Zn, Cu, Cr, Sr, Y, Zr, Nb, Mo, Ru, Rh, Pd, Ag, Cd, and In.

9. The positive active material of claim 1, wherein the overlithiated lithium transition metal oxide is represented by Formula 2 below:

$$xLi_2MnO_3\text{-}(1-x)LiNi_{1-a'-a''-b}Co_{a'}Mn_{a''}M''_bO_2 \qquad \text{Formula 2}$$

wherein,
M" is at least one metal cation selected from Al, Mg, Ga, Ti, V, Zn, Cu, Cr, Sr, Y, Zr, Nb, Mo, Ru, Rh, Pd, Ag, Cd, and In, and
$0<x\le0.2$; $0<a'<1$, $0<a''<1$ and $0.001\le b\le0.1$, where $0.7<1-a'-a''-b<1$.

10. The positive active material of claim 1, wherein the overlithiated lithium transition metal oxide further comprises fluorine.

11. The positive active material of claim 10, wherein the overlithiated lithium transition metal oxide is represented by Formula 3 below:

$$xLi_2MnO_{3-\delta}F\delta\text{-}(1-x)LiNi_{1-a'-a''-b}Co_{a'}Mn_{a''}M''_bO_{2-\delta'}F_{\delta'} \qquad \text{Formula 3}$$

wherein,
M" is at least one metal cation selected from Al, Mg, Ga, Ti, V, Zn, Cu, Cr, Sr, Y, Zr, Nb, Mo, Ru, Rh, Pd, Ag, Cd, and In, and
$0<x\le0.2$; $0<a'<1$, $0<a''<1$ and $0.001\le b\le0.1$, where $0.7<1-a'-a''-b<1$; and $0<\delta+\delta'<0.1$.

12. The positive active material of claim 1, wherein the overlithiated lithium transition metal oxide has an average particle diameter of about 10 nanometers to about 500 micrometers.

13. A positive electrode comprising, a positive active material of claim 1.

14. A lithium battery comprising the positive electrode of claim 13.

15. An overlithiated lithium transition metal oxide represented by Formula:

$$xLi_2MO_3\text{-}(1-x)LiNi_{1-a-b}M'_aM''_bO_2 \qquad \text{Formula 1}$$

wherein,
M is at least one metal selected from a Period 4 transition metal having an average oxidation number of +4 and a Period 5 transition metal having an average oxidation number of +4
M' is at least one metal selected from a Period 4 transition metal having an average oxidation number of +3 and a Period 5 transition metal having an average oxidation number of +3,
M" is different from M', and is at least one metal cation selected from Al, Mg, Ga, Ti, V, Zn, Cu, Cr, Sr, Y, Zr, Nb, Mo, Ru, Rh, Pd, Ag, Cd, and In, and
$0<x\le0.2$; $0<a<1$ and $0.001\le b\le0.1$, where $0.7\le1-a-b<1$.

16. The overlithiated lithium transition metal oxide of claim 15, wherein the overlithiated lithium transition metal oxide is represented by Formula 2 below:

$$xLi_2MnO_3\text{-}(1-x)LiNi_{1-a'-a''-b}Co_{a'}Mn_{a''}M''_bO_2 \qquad \text{Formula 2}$$

wherein,
M" is at least one metal cation selected from Al, Mg, Ga, Ti, V, Zn, Cu, Cr, Sr, Y, Zr, Nb, Mo, Ru, Rh, Pd, Ag, Cd, and In, and
$0<x\le0.2$; $0<a'<1$, $0<a''<1$ and $0.001\le b\le0.1$, where $0.7\le1-a'-a''-b<1$.

17. The overlithiated lithium transition metal oxide of claim 15, wherein the overlithiated lithium transition metal oxide further comprises fluorine.

18. The overlithiated lithium transition metal oxide of claim 17, wherein the overlithiated lithium transition metal oxide is represented by Formula 3 below:

$$xLi_2MnO_{3-\delta}F\delta\text{-}(1-x)LiNi_{1-a'-a''-b}Co_{a''}Mn_{a''}M''_bO_{2-\delta'}F_{\delta'} \qquad \text{Formula 3}$$

wherein,
M" is at least one metal cation of Al, Mg, Ga, Ti, V, Zn, Cu, Cr, Sr, Y, Zr, Nb, Mo, Ru, Rh, Pd, Ag, Cd, and In, and
$0<x\le0.2$; $0<a'<1$, $0<a''<1$ and $0.001\le b\le0.1$, where $0.7<1-a'-a''-b<1$; and $0<\delta+\delta'<0.1$.

* * * * *